US012572420B2

(12) United States Patent
McCrate et al.

(10) Patent No.: US 12,572,420 B2
(45) Date of Patent: Mar. 10, 2026

(54) DATA PROTECTION SUPPLEMENTAL TO DATA RECOVERY

(71) Applicant: Micron Technology, Inc., Boise, ID (US)

(72) Inventors: Joseph M. McCrate, Boise, ID (US); Marco Sforzin, Cernusco Sul Naviglio (IT); Paolo Amato, Treviglio (IT); Brian M. Twait, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 97 days.

(21) Appl. No.: 18/444,523

(22) Filed: Feb. 16, 2024

(65) Prior Publication Data

US 2024/0303159 A1 Sep. 12, 2024

Related U.S. Application Data

(60) Provisional application No. 63/450,899, filed on Mar. 8, 2023.

(51) Int. Cl.
*G06F 11/10* (2006.01)

(52) U.S. Cl.
CPC ...... *G06F 11/1076* (2013.01); *G06F 11/1004* (2013.01); *G06F 11/1016* (2013.01)

(58) Field of Classification Search
CPC ............. G06F 11/1004; G06F 11/1016; G06F 11/1076
See application file for complete search history.

(56) References Cited

U.S. PATENT DOCUMENTS

| | | | |
|---|---|---|---|
| 11,687,273 B2 | 6/2023 | Confalonieri | |
| 12,222,807 B2 * | 2/2025 | Wu ......................... | G06F 11/10 |
| 2003/0217300 A1 | 11/2003 | Fukumori et al. | |
| 2007/0150790 A1 * | 6/2007 | Gross .................. | G06F 11/1044 |
| | | | 714/763 |
| 2009/0141544 A1 * | 6/2009 | Sakimura ............ | G06F 11/1044 |
| | | | 365/158 |
| 2012/0117418 A1 * | 5/2012 | Gilbert ................ | G06F 11/1044 |
| | | | 714/E11.034 |
| 2015/0067443 A1 * | 3/2015 | Bao ........................ | G06F 3/0647 |
| | | | 714/764 |
| 2016/0117221 A1 | 4/2016 | Nair et al. | |
| 2020/0104257 A1 | 4/2020 | Lee et al. | |
| 2020/0278908 A1 * | 9/2020 | Schaefer .............. | G11C 7/1018 |
| 2023/0393940 A1 | 12/2023 | Del Gatto | |
| 2024/0004751 A1 | 1/2024 | Sforzin | |
| 2024/0004759 A1 | 1/2024 | Sforzin | |

(Continued)

OTHER PUBLICATIONS

Wikipedia's Cyclic Redundancy Check Historical version published Mar. 7, 2023 https://en.wikipedia.org/w/index.php?title=Cyclic_redundancy_check&oldid=1143342277 (Year: 2023).*

*Primary Examiner* — Joseph O Schell
(74) *Attorney, Agent, or Firm* — Brooks, Cameron & Huebsch, PLLC

(57) ABSTRACT

A redundant array of independent disks (RAID) protection can be provided along with other types of error correction code (ECC) schemes that can correct residual bit errors. The bit errors correctable by the ECC schemes not only include those errors that have been existing in input data used for the RAID process, but also those bit errors may have been propagated due to the existing errors.

15 Claims, 6 Drawing Sheets

(56)                    References Cited

U.S. PATENT DOCUMENTS

| 2024/0004807 | A1 | 1/2024 | Amato |
| 2024/0005010 | A1 | 1/2024 | Sforzin |
| 2024/0007265 | A1 | 1/2024 | Amato |

* cited by examiner

DATA PROTECTION SUPPLEMENTAL TO DATA RECOVERY

PRIORITY INFORMATION

This application claims the benefit of U.S. Provisional Application No. 63/450,899, filed on Mar. 8, 2023, the contents of which are incorporated herein by reference.

TECHNICAL FIELD

The present disclosure relates generally to semiconductor memory and methods, and more particularly, to apparatuses, systems, and methods related to providing data protection and recovery schemes.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
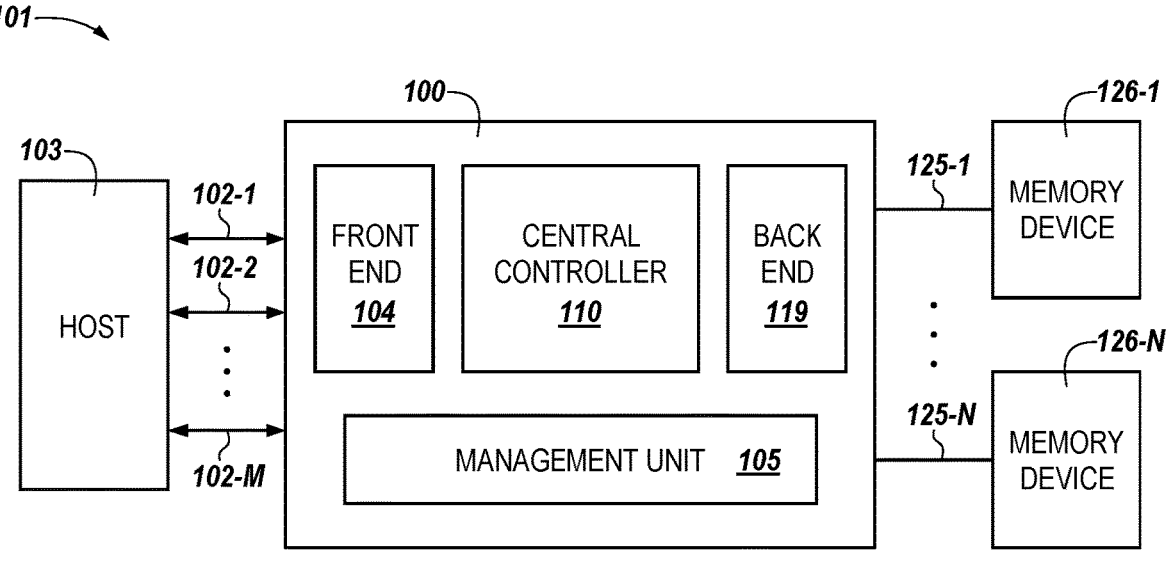
FIG. 1 is a functional block diagram of a computing system including a memory controller in accordance with a number of embodiments of the present disclosure.

Systems, apparatuses, and methods related to providing protection and recovery schemes are described. Data protection and recovery schemes are often an important aspect of RAS (Reliability, Availability, and Serviceability) associated with memory systems. Such schemes may provide a "chip kill", in which the memory system can work properly even if a constituent chip, such as a memory die, is damaged; thereby, avoiding a situation of one of the chips being a single point of failure (SPOF) of the memory system. Often, the chip kill capability is provided through various error correction code (ECC) schemes, such as a "Redundant Array of Independent Disks" or "Redundant Array of Independent devices" (RAID) scheme, which allow data recovery of the damaged chip by reading subsets of data from the other constituent chips of the RAID scheme.

A RAID operation of the RAID scheme and performed using any subsets including errors can further result in errors in a recovered subset of the damaged chip. Therefore, the RAID scheme alone may not protect data across all of the constituent chips if there had been errors on data read from multiple constituent chips of the RAID scheme.

Embodiments are directed to providing additional error correction and/or detection capabilities that operate in conjunction with the RAID scheme. For example, an error correction capability can be provided subsequent to a RAID operation to correct any residual errors (e.g., bit errors) that have been present on subsets used for the RAID operation as well as those errors propagated to a recovered subset. Further, an error detection capability can be provided subsequent to the error correction capability to ensure that the errors have been corrected via the error correction capability. Therefore, the additional error correction and/or detection capabilities provided by the present disclosure can supplement the limitations of the RAID scheme.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transferred, read, transmitted, received, or exchanged by electronic signals (e.g., current, voltage, etc.).

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators "M" and "N", particularly with respect to reference numerals in the drawings, indicate that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 (alternatively referred to as "memory system") including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. As an example, the interface of the front end 104 can be a PCIe 5.0 or 6.0 interface coupled to the I/O lanes 102. In some embodiments, the memory controller 100 can receive access requests involving the memory device 126 via the PCIe 5.0 or 6.0 interface according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or data recovery information based on data received from the host 103. The central controller portion 110 can perform error detection operations and/or data recovery operations on data received from the host 103 or from the memory devices 126. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. An error correction operation (alternatively referred to as error correction code (ECC) operation) can be performed to correct an amount of bit errors and/or detect an amount of bit errors that may have not been corrected using the ECC operation. Error correction information used to perform the ECC operation can be parity data (alternatively referred to as "ECC bits" or "ECC data"), which are generated by comparing (e.g., XORing) at least a portion of rows (e.g., bit patterns) of encoding matrix (alternatively referred to as a parity matrix) that respectively correspond to bits of user data (e.g., data received from the host 103) having a particular value.

A data recovery operation (alternatively referred to as "RAID operation") can be a chip kill operation, which protects the memory system even if a constituent chip (e.g., a memory die, such as a memory die 227 illustrated in FIGS. 2A and/or 2B) is damaged, which can avoid a situation in which one of the chips serves as a single point of failure (SPOF) of the memory system. Often, the chip kill capability is provided through various ECC schemes including a "Redundant Array of Independent Disks" (RAID) scheme, which allow data recovery of the damaged chip by reading all of the constituent chips of the memory system.

The chip kill can involve parity data (e.g., RAID parity) that are specifically designed for data recovery of the damaged chip. The RAID parity data can be generated by comparing (e.g., XORing) each subset of user data (e.g., subsets 331-1, . . . , 331-8 and 331-10 illustrated in FIG. 3). The user data that share the same RAID parity data can be referred to as being grouped together. A RAID operation is an example of a "data recovery operation," and can be referred to as such. While the error correction operation (e.g., ECC operation) is performed to correct (e.g., flip) one or more bits of the subset that is indicated as having errors, the data recovery operation reconstructs and recovers the subset (without flipping one or more bits of the subset) using the other subsets.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types of data buses, such as a eight-pin data bus (e.g., data input/output (DQ) bus) and a one-pin data mask inversion (DMI) bus, among other possible buses.

The memory devices 126 can be various/different types of memory devices. For instance, the memory device can include an array RAM, ROM, DRAM, SDRAM, PCRAM, RRAM, and flash memory cells, among others. In embodiments in which the memory device 126 includes persistent or non-volatile memory, the memory device 126 can be flash memory devices such as NAND or NOR flash memory devices. Embodiments are not so limited, however, and the memory device 126 can include an array of other non-volatile memory cells such as non-volatile random-access memory cells (e.g., non-volatile RAM (NVRAM), ReRAM, ferroelectric RAM (FeRAM), MRAM, PCRAM), "emerging" memory cells such as a ferroelectric RAM cells that includes ferroelectric capacitors that can exhibit hysteresis characteristics, a memory device with resistive, phase-change, or similar memory cells, etc., or combinations thereof.

As an example, a FeRAM device (e.g., a memory device 126 include an array of FeRAM cells) can include ferro-electric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polar-ization reversal that yields non-linear dielectric behavior.

In another example, the memory devices 126 can be a dynamic random access memory (DRAM) device (e.g., the memory device 126 including an array of DRAM cells) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 primarily in forms of a memory transfer block (MTB) that includes a number of user data blocks (UDBs). As used herein, the term "MTB" refers to a group of UDBs that are grouped with a same parity data block (PDB) (e.g., share a same PDB); therefore, are transferred together from a cache (e.g., the cache 212) and/or memory devices 126 for each read or write command. For example, the group of UDBs of the same MTB can be transferred to/from (e.g., written to/read from) the memory devices 126 via the channels 125 over a predefined burst length (e.g., a 16-bit or 32-bit BL) that the memory con-troller 100 operates with.

A burst is a series of data transfers over multiple cycles, such as beats. As used herein, the term "beat" refers to a clock cycle increment during which an amount of data equal to the width of the memory bus may be transmitted. For example, 32-bit burst length can be made up of 32 beats of data transfers, while 16-bit burst length can be made up of 16 beats of data transfers. Although embodiments are not so limited, a bus width corresponding to a size of each beat can be 8 (e.g., alternatively referred to as "×8").

As used herein, the term "PDB" refers to a data block containing parity data (e.g., RAID parity) for a chip kill (e.g., RAID) operation on UDBs that are grouped with the PDB. As further described herein, an MTB can be in a plain text or cypher text form depending on whether the MTB has been encrypted at the memory controller 100 (e.g., the security encoder 217-1 illustrated in FIGS. 2A and 2B).

As used herein, the term "UDB" refers to a data block containing host data (e.g., received from the host 103 and alternatively referred to as "user data"). While an UDB can correspond to the size of a host read and/or write request, an MTB can be a unit of read and/or write access to the memory devices. Along with the MTB, a PDB can be also transferred between the back end portion 119 and the memory devices 126. The host data or the parity data of a single UDB or PDB can correspond to multiple codewords (e.g., 64 codewords).

Along with the UDB, other "extra" bits of data (e.g., other data in addition to data corresponding to an UDB and alternatively referred to as "auxiliary data") can also be transferred between the back end portion 119 and the memory devices 126. The extra data can include data used to correct and/or detect errors in UDB and/or authenticate and/or check data integrity of the UDB, and/or metadata, although embodiments are not so limited. Further details of the extra bits are illustrated and described in connection with FIGS. 2-3.

In some embodiments, some (e.g., one or more) memory devices 126 can be dedicated for PDBs or auxiliary data. For example, memory devices configured to store UDBs can be different from a memory device (e.g., one or more memory devices) configured to store PDBs or auxiliary data.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializ-ing, configuring, and/or monitoring the characteristics of the memory controller, and a management unit memory to store data associated with initializing, configuring, and/or moni-toring the characteristics of the memory controller 100. As used herein, the term "out-of-band" generally refers to a transmission medium that is different from a primary trans-mission medium of a network. For example, out-of-band data and/or commands can be data and/or commands trans-ferred to a network using a different transmission medium than the transmission medium used to transfer data within the network.

Figure 2A:
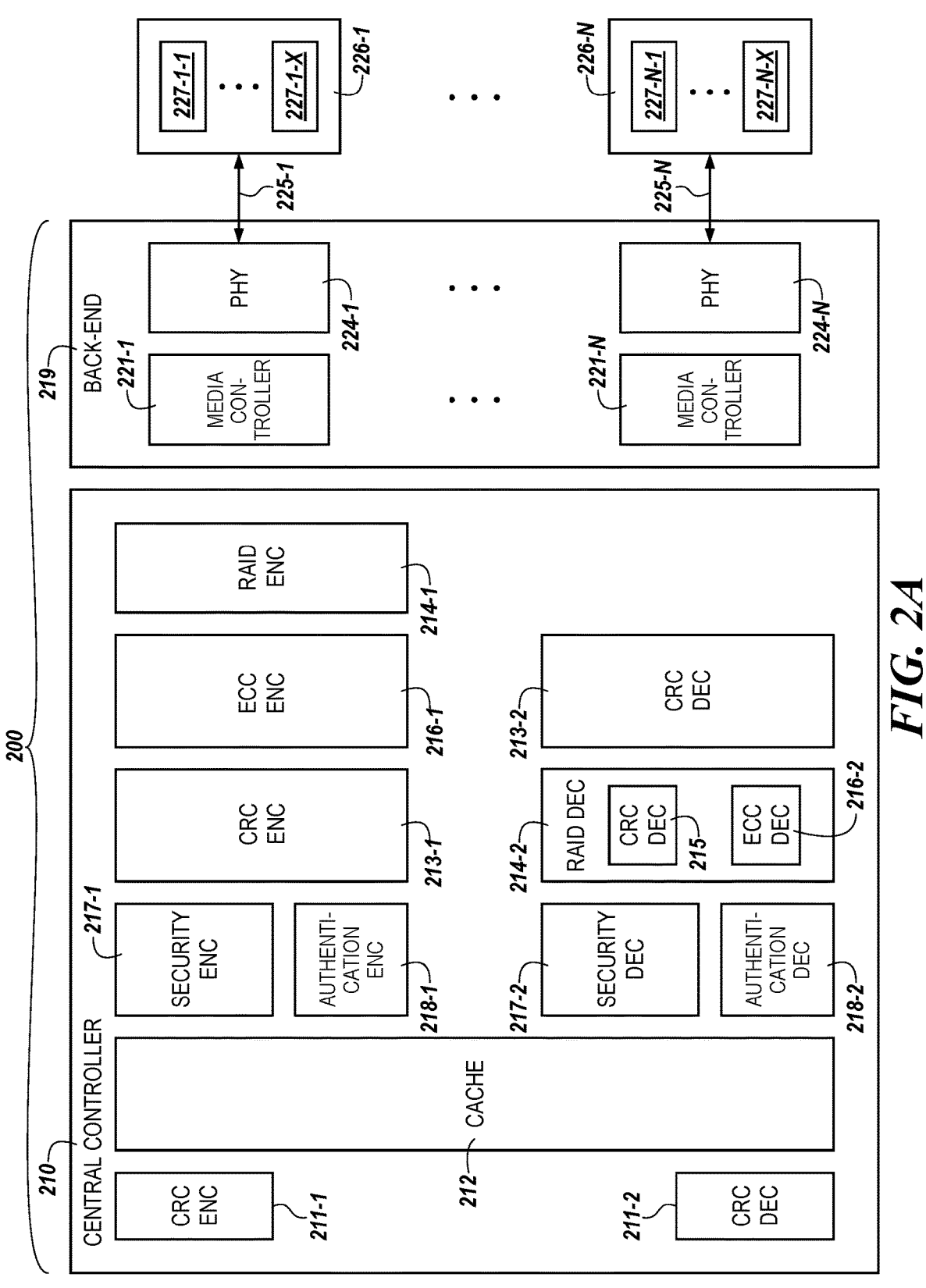
FIG. 2A is a functional block diagram of a memory controller having a redundant array of independent disks (RAID) encoder/decoder, which is alternatively referred to as redundant array of independent devices (RAID) encoder/decoder, in accordance with a number of embodiments of the present disclosure.

FIG. 2A is a functional block diagram of a memory controller 200 for cache line data protection in accordance with a number of embodiments of the present disclosure. The memory controller 200, the central controller portion 210, the back end portion 219, and the memory devices 226 illustrated in FIG. 2A are analogous to the memory control-ler 100, the central controller portion 210, the back end portion 119, and the memory devices 126 illustrated in FIG. 1.

The central controller portion 210 includes a front-end CRC ("FCRC") encoder 211-1 (e.g., paired with a FCRC decoder 211-2) to generate error detection information (e.g., alternatively referred to as end-to-end CRC (e2e CRC)) based on data (e.g., an UDB in "plain text" form) received as a part of a write command (e.g., received from the host 103) and before writing the data to the cache 212. The error detection information generated at the FCRC encoder 211-1 can be a check value, such as CRC data. Read and write commands of CXL memory systems can be a size of UDB, such as 64 bytes. Accordingly, the data received at the FCRC encoder 211-1 can correspond to a UDB.

The central controller portion 210 includes a cache 212 to store data (e.g., user data), error detection information, error correction information, and/or metadata associated with performance of the memory operation. An example of the cache 212 is a thirty-two (32) way set-associative cache including multiple cache lines. While host read and write commands can be a size of an UDB (e.g., 64 bytes), the cache line size can be greater than a size of an UDB (e.g., equal to a size of multiple UDBs). For example, the cache line size can correspond to a size of 2 UDBs (with each UDB being a 64-byte chunk), such as 128 bytes.

These UDBs stored in each cache line (e.g., alternatively referred to as "UDBs corresponding to a cache line") can be a data transfer unit of data paths between the cache 212 and the memory devices 226. For example, even though a host read/write command is a size of an UDB, such as 64 bytes, the UDBs corresponding to a cache line can be collectively transferred between the cache 212 and the memory devices 226 (e.g., through other encoder/decoder illustrated in FIG. 2A) as a chunk. Therefore, the UDBs corresponding to a cache line can be collectively encrypted/decrypted at various encoder/decoders illustrated in FIG. 2A and located between the cache 212 and the memory devices 226. Therefore, UDBs corresponding to a cache line can correspond to a same RAID stripe as further described below. As used herein, the term "RAID stripe" refers to data comprising RAID parity data (e.g., subset 331-9 illustrated in FIG. 3) as well as data (e.g., subsets 331-1, . . . , 331-8 and 331-10) that were used to generate the RAID parity data.

Data (e.g., UDBs) stored in (e.g., a respective cache line of) the cache 212 can be further transferred to the other components (e.g., a security encoder 217-1 and/or an authenticity/integrity check encoder 218-1, which is shown as "AUTHENTICATION ENC" 218-1) of the central controller portion 210 (e.g., as part of cache writing policies, such as cache writeback and/or cache writethrough) to be ultimately stored in the memory devices 226 to synchronizes the cache 212 and the memory devices 226 in the event that the data received from the host (e.g., the host 103 illustrated in FIG. 1) have not been written to the memory devices 226 yet.

Use of the cache 212 to store data associated with a read operation or a write operation can increase a speed and/or efficiency of accessing the data because the cache 212 can prefetch the data and store the data in multiple 64-byte blocks in the case of a cache miss. Instead of searching a separate memory device in the event of a cache miss, the data can be read from the cache 212. Less time and energy may be used accessing the prefetched data than would be used if the memory system has to search for the data before accessing the data.

The central controller portion 210 further includes a security encoder 217-1 (e.g., paired with a security decoder 217-2) to encrypt data (e.g., UDBs corresponding to a cache line) before transferring the data to a ECC encoder 216-1 (to write the data to the memory devices 226). Although embodiments are not so limited, the pair of security encoder/decoder 217 can operate using an AES encryption/decryption (e.g., algorithm). Unencrypted data (e.g., plain text) can be converted to cypher text via encryption by the security encoder 217-1. The central controller portion 210 further includes an authenticity/integrity check encoder 218-1 to generate authentication data based on data received from the cache 212. Although embodiments are not so limited, the authentication data generated at the authenticity/integrity check encoder 218-1 can be MAC, such as KECCAK MAC (KMAC) (e.g., SHA-3-256 MAC).

In some embodiments, the MAC generated at the authenticity/integrity check encoder 218-1 can be calculated based on trusted execution environment (TEE) data (alternatively referred to as "TEE flag"), Host Physical Address (HPA) (e.g., a memory address used/identified by the host 103 illustrated in FIG. 1 in association with host read/write transactions), a security key identifier (ID) that are associated with a physical address (of the memory devices 226) to be accessed for executing a host write command.

The security encoder 217-1 and the authenticity/integrity check encoder 218-1 can operate in parallel. For example, the data stored in the cache 212 and that are in plain text form can be input (e.g., transferred) to both the security encoder 217-1 and the authenticity/integrity check encoder 218-1. In some embodiments, a security key ID can be further input (along with the data in plain text form) to the security encoder 217-1. Further, in some embodiments, a security key ID, TEE flag, and an HPA associated with a host write command can be further input (along with the data in plain text form) to the authenticity/integrity check encoder 218-1.

The central controller portion 210 includes a CRC encoder 213-1 (e.g., paired with a CRC decoder 213-2) to generate error detection information, which is alternatively referred to as CRC media (CRCm), based collectively on one or more UDBs corresponding to a cache line and transferred from the security encoder 217-1. The data transferred and input to the CRC encoder 213-1 can be in cypher text form as the data were previously encrypted at the security encoder 217-1. The error detection information generated at the error detection information generator 213-1 can be a check value, such as CRC data (alternatively referred to as "error detection data"). The CRC encoder 213-1 and CRC decoder 213-2 can operate on data having a size equal to or greater than a cache line size.

As shown in FIG. 2A, the central controller portion 210 can include a ECC encoders 216-1. The ECC encoder 216-1 can be configured to generate ECC data (alternatively referred to as "error correction data") based collectively on one or more UDBs corresponding to a cache line as well as error detection information generated at the respective CRC encoder 213-1. The ECC data can be later used at a ECC decoder 216-2 to correct multiple bit errors over subsets (of the UDBs corresponding to a cache line) that are to be respective written to each memory devices 226 and/or dice. In some embodiments, the ECC data can include parity data.

The central controller portion 210 includes RAID encoder 214-1 (e.g., paired with a RAID decoder 214-2) to generate and/or update RAID parity data (e.g., a PDB) based at least in part on data (e.g., one or more UDBs corresponding to a cache line, error correction information generated at the respective ECC encoder 216-1, and error detection information generated at the CRC encoder 213-1) received from the CRC encoder 213-1. The data transferred to the RAID encoder 214-1 from the CRC encoder 213-1 can be in cypher text form as the data were encrypted at the security encoder 217-1.

In some embodiments, the RAID encoder 214-1 can update the PDB to conform to new UDB received as part of a write command from the host. To update the PDB, an old UDB (that is to be replaced with the new UDB) and an old PDB (of a same stripe as the old UDB) can be read (e.g., transferred to the RAID encoder 214-1) and compared (e.g., XORed) with the new UDB, and a result of the comparison (e.g., the XOR operation) can be further compared (e.g., XORed) with an old PDB (that is to be updated) to result in a new (e.g., updated) PDB.

"Extra" bits of data (alternatively referred to as "auxiliary data") can be transferred (along with the UDBs) to the back end portion 219 to be ultimately transferred and written to the memory devices 226. The "extra" bits can include RAID parity data (e.g., in forms of a PDB) generated at the RAID 214-1, CRC data generated at the FCRC encoder 211-1 and/or CRC encoder 213-1, ECC data generated at the ECC encoders 216-1, and/or authentication data (e.g., MAC data) generated at the authenticity/integrity check encoder 218-1 that are associated with the UDBs as well as metadata and/or TEE data.

In one embodiment, the auxiliary data (including at least CRC data, ECC data, and metadata) can be written to a different memory die 227 (alternatively referred to as a "memory unit") than those memory dice 227 to which one or more UDBs and/or PDBs are to be written. In a different embodiment, the auxiliary data can be written to the same (e.g., one or more) memory dice 227 as UDBs. Further, PDBs can be written to a different/dedicated memory device 226 or memory die 227 than those memory devices 226 and/or memory dice 227 to which UDBs or auxiliary data are written.

The error correction information (e.g., to correct "mirrored" bit errors) generated collectively on data corresponding to a RAID stripe can provide benefits such as a smaller number of bits for the error correction information as compared to other approaches. As used herein, the term "mirrored bit errors" refers to those bit errors on a recovered subset and caused from bit errors that have been present in an input subset of a RAID process. As used herein, the term "input subset" refers to a subset input to a RAID process and used as part of a RAID operation to recover another subset.

For example, consider an example, in which an error correction capability of correcting a single bit error is provided for each subset to cover a single "mirrored" bit error (caused as a result of an input subset having a single bit error). In this example, if there are 10 subsets corresponding to a RAID stripe, error correction information (e.g., having 8 bits) needs to be generated for each subset (each having 32 bytes), which can amount to 80 bits (e.g., 8 bits/subset*10 subsets) and result in 10 different codewords for which the error correction information generated for each subset operates. In contrast, error correction information that can correct two bit errors (thereby, being capable of correcting an existing single bit error as well as a single "mirrored" bit error) collectively on 10 subsets (of a single codeword) can be merely 22 bits, which is fewer than 80 bits.

As shown in FIG. 2A, the memory controller 200 can include a back end portion 219 coupled to the central controller portion 210. The back end portion 219 can include media controllers 221-1, . . . , 221-N. The back end portion 219 can include PHY memory interfaces 224-1, . . . , 224-N. Each physical interface 224 is configured to be coupled to a respective memory device 226.

The media controllers 221-1, . . . , 221-N can be used substantially simultaneously to drive the channels 225-1, . . . , 225-N simultaneously. In at least one embodiment, each of the media controllers 221 can receive a same command and address and drive the channels 225 substantially simultaneously. By using the same command and address, each of the media controllers 221 can utilize the channels 225 to perform the same memory operation on the same memory cells.

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be contemporaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

The channels 225 can include a number of separate data protection channels (alternatively referred to as RAS (Reliability, Availability, and Serviceability) channel), which can each comprise a number of memory devices (e.g., dice) 226 accessed together in association with a particular data protection scheme (e.g., RAID, LPCK, etc.). The data protection channels can include RAID (e.g., locked-RAID) channels. In a RAID process that is "locked", all the subsets corresponding to a RAID stripe are collectively accessed together regardless of whether a corresponding RAID process is triggered or not. For example, the subsets can be collectively accessed together even in response to a mere host read request for accessing a portion (e.g., one) of the subsets, which makes a RAID process readily available without incurring an additional/separate access to the other subsets. As used herein, the term "RAID channel" refers to one or more channels (e.g., channels 125 and/or 225 illustrated in FIGS. 1 and 2, respectively) that are accessed together for RAID access. Alternatively speaking, a RAID channel can be an access unit for transfer of a single RAID stripe. For example, the channels 225 can be organized as a number of RAID channels with each RAID channel comprising a particular quantity of channels 225.

The PHY memory interfaces 224 can be an LPDDRx memory interface. In some embodiments, each of the PHY memory interfaces 224 can include data and DMI pins. For example, each PHY memory interface 224 can include twenty data pins (DQ pins) and five DMI pins. The media controllers 221 can be configured to exchange data with a respective memory device 226 via the data pins. The media controllers 221 can be configured to exchange error correction information (e.g., ECC data), error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, the data can be exchanged simultaneously with the error correction information and/or the error detection information. For example, UDBs can be exchanged (transmitted or received) via the data pins while the extra bits are exchanged via the DMI pins. Such embodiments reduce what would otherwise be overhead on the data input/output (e.g., also referred to in the art as a "DQ") bus for transferring error correction information, error detection information, and/or metadata.

The back end portion 219 can couple the PHY memory interfaces 224-1, . . . , 224-N to respective memory devices 226-1, . . . , 226-N. The memory devices 226 each include at least one array of memory cells. In some embodiments, the memory devices 226 can be different types of memory. The media controllers 221 can be configured to control at least two different types of memory. For example, the memory device 226-1 can be LPDDRx memory operated according to a first protocol and the memory device 226-N can be LPDDRx memory operated according to a second protocol different from the first protocol. In such an example, the first media controller 221-1 can be configured to control a first subset of the memory devices 226-1 according to the first protocol and the second media controller 221-N can be configured to control a second subset of the memory devices 226-N according to the second protocol.

As illustrated in FIG. 2A, each memory device 226 can include one or more memory dice. For example, a memory device 226-1 includes memory dice 227-1-1, . . . , 227-1-X, while a memory device 226-N includes memory dice 227-1-1, . . . , 227-1-X. Although embodiments are not so limited, at least two memory devices 226 can include different quantities of memory dice.

Data (UDBs corresponding to a cache line) stored in the memory devices 226 can be transferred to the back end portion 219 to be ultimately transferred and written to the cache 212 and/or transferred to the host (e.g., the host 103 illustrated in FIG. 1). In some embodiments, the data are transferred in response to a read command to access a subset of the data (e.g., one UDB) and/or to synchronize the cache 212 and the memory devices 226 to clean up "dirty" data in the cache 212.

Along with the UDBs, other "extra" bits of data (alternatively referred to as "auxiliary data") can be transferred to the back end portion 219 as well. The "extra" bits can include CRC data generated at the FCRC encoder 211-1 and/or 213-1, ECC data generated at the ECC encoders 216-1, and authentication data generated at the authenticity/integrity check encoder 218-1 that are associated with the UDBs as well as metadata and/or TEE data. As described herein, the UDBs transferred to the back end portion 219 can be in cypher text form.

The UDBs corresponding to a cache line can be further transferred (e.g., from the back end portion 219) to the CRC decoder 213-2 along with at least the error detection information previously generated at the CRC encoder 213-1. At the CRC decoder 213-2, an error detection operation can be performed to detect any errors in the UDBs (e.g., and/or auxiliary data, such as ECC data, metadata, etc.) using the error detection information, such as CRC data. The CRC decoder 213-2 can operate on data in conjunction with the RAID decoder 214-2 to provide check-and-recover correction. More specifically, the CRC decoder 213-2 can detect an error in data (e.g., received from the respective ECC decoder 216-2) and the RAID decoder 214-2 can recover the data in response.

When the RAID process is triggered, the RAID operation performed on data (e.g., one or more UDBs corresponding to a cache line as well as auxiliary data including at least ECC data, metadata, etc.) can recover a subset of the data that was transferred from one (e.g., failed) memory die, for example. Since all of the subsets is collectively input (e.g., transferred) to the CRC decoder (e.g., the CRC decoder 213-2 illustrated in FIG. 2A) and collectively checked for one or more errors (alternatively referred to as "locked-RAID"), the CRC check performed at the CRC decoder may not indicate which subset has one or more errors. Therefore, the triggered RAID process involves multiple RAID operations that can be respectively and independently performed on each subset to correct the one subset that indeed has the errors.

Subsequent to performance of the RAID operations, results (e.g., each including UDBs corresponding to a cache line as well as a respective subset recovered, which is alternatively referred to as a "resulting RAID stripe") respectively corresponding to the RAID operations can be input to an ECC decoder 216-2. For example, the ECC decoder 216-2 can perform multiple error correction operations respectively on the results to correct any residual errors on subsets corresponding to multiple memory devices 226 and/or dice.

At the ECC decoder 216-2, an error correction operation can be performed on the data to correct error(s) up to a particular quantity and/or detect errors beyond particular quantity without correcting those. For example, the ECC decoder 216-2 can use the error correction information to correct multiple bit errors on different subsets. Although embodiments are not so limited, the error correction information can provide an error correction capability of correcting a quantity of bit errors of multiples of two. For example, the error correction information can provide an error correction capability of correcting $2^x$ (x being a positive integer) bit errors on one or more subsets. In a particular example, the ECC decoder 216-2 can use the error correction information (e.g., ECC data) to correct two bit errors without detecting more than two bit errors, which is referred to as a double error correction (DEC) operation. In this example, the ECC decoder 216-2 can provide an error correction capability of correcting each single bit error in two subsets.

Bit errors that are correctable at the ECC decoder 216-2 can include a quantity of bit errors that have further caused from a respective RAID operation. For example, a RAID operation performed using one or more subsets having one or more bit errors may further cause (e.g., mirror) corresponding one or more bit errors in a recovered subset. In this example, a result input to the ECC decoder 216-2 can include those bit errors present in the subsets used for a RAID operation as well as those bit errors on the recovered subset.

Results (e.g., each including one or more UDBs corresponding to a cache line possibly with one or more bit errors corrected) from the ECC decoder 216-2 can be further input to a CRC decoder 215 that provides the same functionality as the CRC decoder 213-2, but to perform an error detection operation (e.g., to CRC-check) on the results. The RAID decoder 214-2 can determine one of the results that is not indicated as including the bit errors and transfer the result to the security decoder 217-2. If none of the results is indicated as not including the bit errors, the central controller 210 can notify the host (e.g., the host 103 illustrated in FIG. 1) of the poisoned data.

As described above, an output (e.g., UDBs corresponding to a cache line) from the RAID decoder 214-2 can be further transferred to the security decoder 217-2 and to the authenticity/integrity check decoder 218-2 (shown as "AUTHENTICATION DEC" 218-2 in FIG. 2A) along with at least the authentication data previously generated at the authenticity/integrity check encoder 218-1. At the security decoder 217-2, the data can be decrypted (e.g., converted from the cypher text back to the plain text as originally received from the host). The security decoder 217-2 can use an AES decryption to decrypt the data.

At the authenticity/integrity check decoder 218-2, the data that were decrypted at the security decoder 217-2 can be authenticated (and/or checked for data integrity) using the authentication data (e.g., MAC data) that were previously generated at the authenticity/integrity check encoder 218-1. In some embodiments, the authenticity/integrity check decoder 218-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 226. If the calculated MAC and transferred MAC match, the UDB is written to the cache 212 (and further transferred to the host if needed). If the calculated MAC and transferred MAC do not match, the host is notified of the mismatch (and/or the poison).

The data (e.g., UDBs corresponding to a cache line) authenticated (and/or checked for data integrity) at the authenticity/integrity check decoder 218-2 can be transferred and written to the cache 212. In some embodiments, data can be further transferred from the cache 212 to the FCRC decoder 211-2, for example, in response to a read command received from the host (e.g., the host 103 illustrated in FIG. 1). As described herein, host read and write commands of CXL memory systems can be a size of UDB, such as 64 bytes. For example, data can be requested by the host in a granularity of an UDB. In this example, even if data transferred from the memory devices 226 are multiple UDBs (corresponding to a cache line), data can be transferred from the cache 212 to the host in a granularity of an UDB.

At the FCRC decoder 211-2, data (e.g., an UDB requested by the host) can be checked (CRC-checked) for any errors using CRC data that were previously generated at the FCRC encoder 211-1. The data decrypted at the FCRC decoder 211-2 can be further transferred to the host.

Figure 2B:
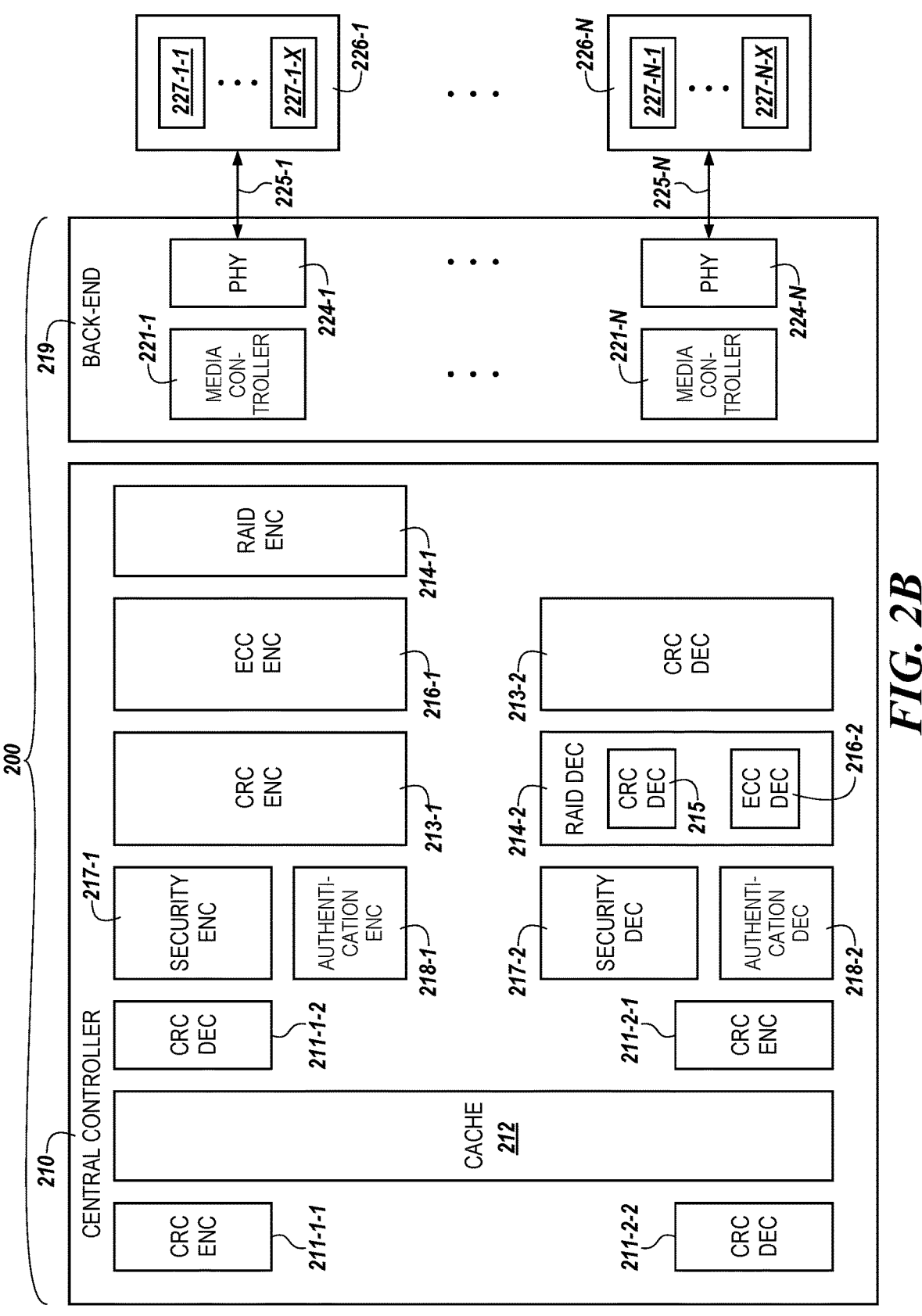
FIG. 2B is another functional block diagram of a memory controller having a RAID encoder/decoder in accordance with a number of embodiments of the present disclosure.

FIG. 2B is another functional block diagram of a memory controller 200 for cache line data protection in accordance with a number of embodiments of the present disclosure. The memory controller 200, the central controller portion 210, the back end portion 219, and the memory devices 226 illustrated in FIG. 2B are analogous to the memory controller 100, the central controller portion 110, the back end portion 119, and the memory devices 126 illustrated in FIG. 1.

The memory controller 200 can include a central controller portion 210, and a back end portion 219. The central controller portion 210 can include a front-end CRC ("FCRC") encoder 211-1-1 paired with a FCRC decoder 211-2 and a FCRC encoder 211-2-1 paired with a FCRC decoder 211-2-1, the cache memory 212 coupled between the paired CRC encoder/decoder 211-1 and CRC encoder/decoder 211-2, the security encoder 217-1 paired with the security decoder 217-2, the authenticity/integrity check encoder 218-1 (shown as "AUTHENTICATION ENC" 218-1 in FIG. 2B) paired with the authenticity/integrity check decoder 218-2 (shown as "AUTHENTICATION DEC" 218-2 in FIG. 2B), the CRC encoder 213-1 paired with the CRC decoder 213-2, the RAID encoder 214-1 paired with the RAID decoder 214-2, and the ECC encoder 216-1 paired with the ECC decoder 216-2. A pair of security encoder/decoder 217, a pair of authenticity/integrity check encoder/decoder 218, a pair of CRC encoder/decoder 213, a pair of RAID 214, a pair of ECC encoder/decoder 216 can be analogous to a pair of security encoder/decoder 217, a pair of authenticity/integrity check encoder/decoder 218, a pair of CRC encoder/decoder 213, a pair of RAID encoder/decoder 214, a pair of ECC encoder/decoder 216 illustrated in FIG. 2A. Although not illustrated in FIG. 2B, the RAID decoder 214-2 can further include a CRC decoder that provides the same functionality as the CRC decoder 213-2, but to perform an error detection operation (e.g., to CRC-check) on data subsequent to the RAID process. The back end portion 219 can include media controllers 221-1, . . . , 221-N and PHY memory interfaces 224-1, . . . , 224-N configured to be coupled to memory devices 226-1, . . . , 226-N via channels 225-1, . . . , 225-N.

FIG. 2B is analogous to FIG. 2A, except that it includes additional circuitry to check any errors on the UDB using CRC data without transferring/storing the CRC to the memory device 226. For example, as illustrated in FIG. 2B, the FCRC decoder 211-1-2 coupled between the cache 212 and the security encoder 217-1 (and/or the authenticity/integrity check encoder 218-1) can be configured to check any errors on an UDB stored in the cache 212 using error detection information (e.g., CRC data) generated at the FCRC encoder 211-1-1. The FCRC encoder 211-2-1 coupled between the cache 212 and the security decoder 217-2 (and/or the authenticity/integrity check decoder 218-2) can be configured generate error detection information (e.g., CRC data) on an UDB to be transferred to the host (e.g., the host 103 illustrated in FIG. 1). The error detection information generated at the FCRC encoder 211-2-1 can be used at the FCRC decoder 211-2-2 to check any errors on an UDB transferred from the cache 212.

In some embodiments, the pairs of CRC encoder/decoder 211-1 and 211-2 can be used just to check errors on data stored in the cache. Accordingly, error detection information (e.g., CRC data) used at the pairs 211-1 and 211-2 may not be transferred and written to the memory devices 226.

Figure 3:
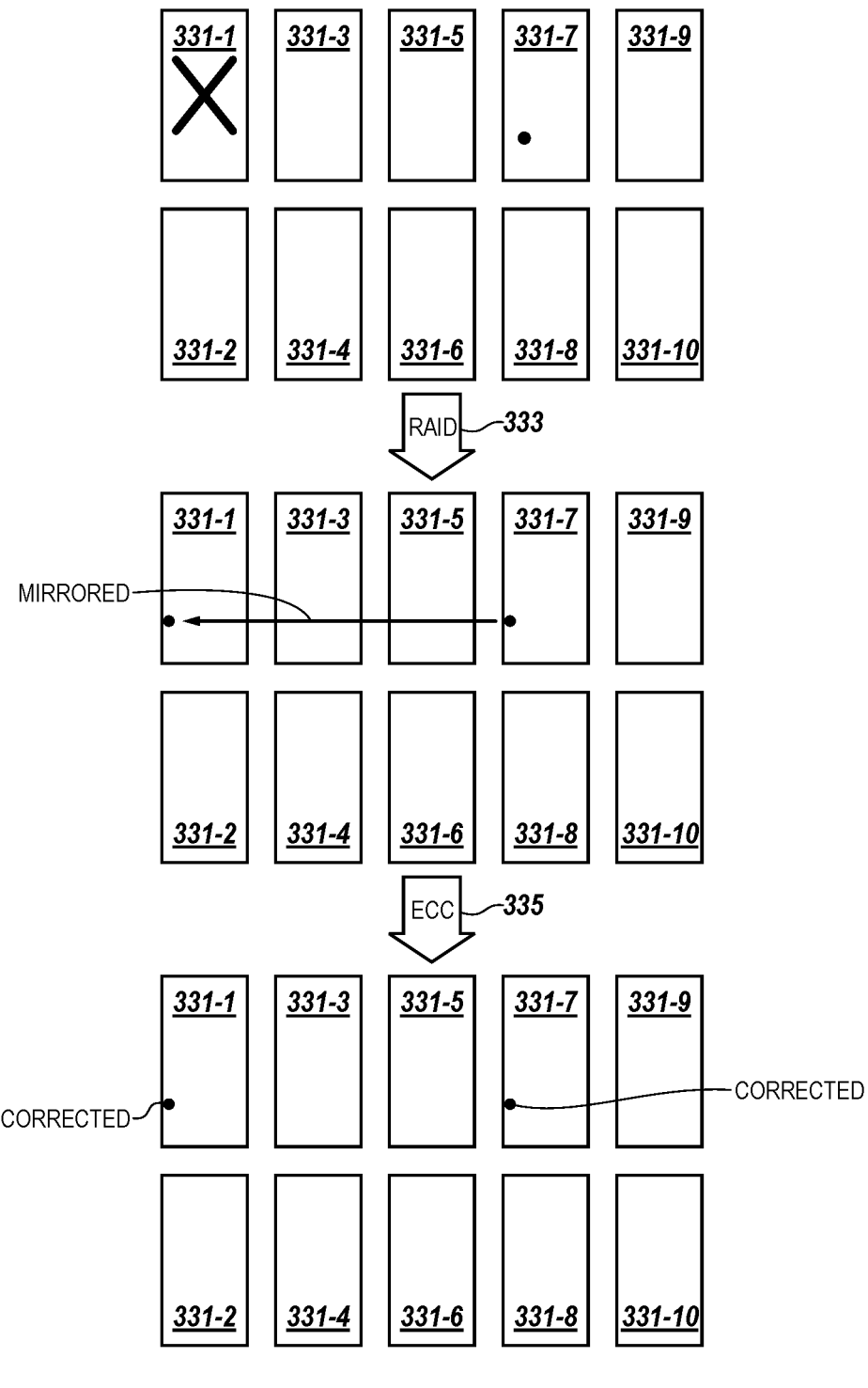
FIG. 3 is a block diagram schematically illustrating data subsets corresponding to a RAID channel and an error correction operation performed on the data subsets in accordance with a number of embodiments of the present disclosure.

FIG. 3 is a block diagram schematically illustrating data subsets corresponding to a RAID channel and an error correction operation performed on the data subsets in accordance with a number of embodiments of the present disclosure. FIG. 3 illustrates ten data subsets (alternatively referred to merely as "subsets") 331-1, . . . , 331-10 corresponding to a RAID (e.g., locked-RAID) channel such that they are read from memory devices (e.g., memory devices 226 illustrated in FIGS. 2A and 2B) and/or dice together as a unit. In an embodiment illustrated in FIG. 3, ten subsets can be respectively read from ten memory dice corresponding to a same memory rank of memory devices (e.g., the memory devices 126 and/or 226 illustrated in FIGS. 1 and 2). As used herein, the term "memory ranks" generally refers to a plurality of memory chips (e.g., memory dice 227 illustrated in FIGS. 2A and/or 2B) that can be accessed substantially simultaneously.

Although embodiments are not so limited, each subset of a RAID channel can be a unit of RAID protection scheme. For example, a RAID process of the RAID protection scheme, when triggered, can recover data corresponding to a single subset.

Further, ten data subsets can respectively correspond to data transferred from ten memory dice. Although embodiments are not so limited, subsets 331-1, . . . , 331-8 can correspond to one or more UDBs and a subset 331-9 can correspond to a PDB. Further, a subset 331-10 can correspond to auxiliary data containing error correction information (e.g., generated at the respective ECC encoder 216-1 illustrated in FIGS. 2A and/or 2B), error detection information (e.g., generated at the CRC encoder 213-1 illustrated in FIGS. 2A and/or 2B), metadata and/or TEE data.

FIG. 3 illustrates an example scenario, in which a subset 331-7 includes one or more bit errors (e.g., a single bit error) and a RAID operation ("RAID" 333 as illustrated in FIG. 3) is performed to recover a subset 331-1. Although embodiments are not so limited, a RAID operation can be performed using one or more UDBs corresponding to the subsets 331-2, . . . , 331-8, a PDB corresponding to the subset 331-9, and auxiliary data corresponding to the subset 331-10.

If subsets 331-2, . . . , 331-8 and 331-10 contains a particular quantity of bit errors, a same quantity of bit errors can be propagated (e.g., mirrored) to a recovered subset. For example, had a single bit error been present in the subsets 331-2, . . . , 331-8 and 331-10, a recovered subset can also include a single bit error. Similarly, had two bit errors been present in the subsets 331-2, . . . , 331-8 and 331-10, a recovered subset can also include two bit errors. Accordingly, in the example illustrated in FIG. 3, one or more bit errors of the subset 331-7 can be propagated to the recovered subset 331-1 as a result of the RAID operation.

As illustrated in FIG. 3, an error correction operation (e.g., "ECC" 335 illustrated in FIG. 3) performed on a result (alternatively referred to as a "resulting RAID stripe") of the RAID operation can correct those bit errors not only in the subset 331-7, but also on the subset 331-1. Consider an example, in which there has been a single bit error in the subset 331-7, which propagates a single bit error in the recovered subset 331-1. In this example, there will be two bit errors on the resulting RAID stripe (e.g., the subsets 331-1, . . . , 331-9) and an error correction operation having a capability of correcting at least two bit errors on the subsets 331-1, . . . , 331-9 can correct those two bit errors.

Figure 4A:
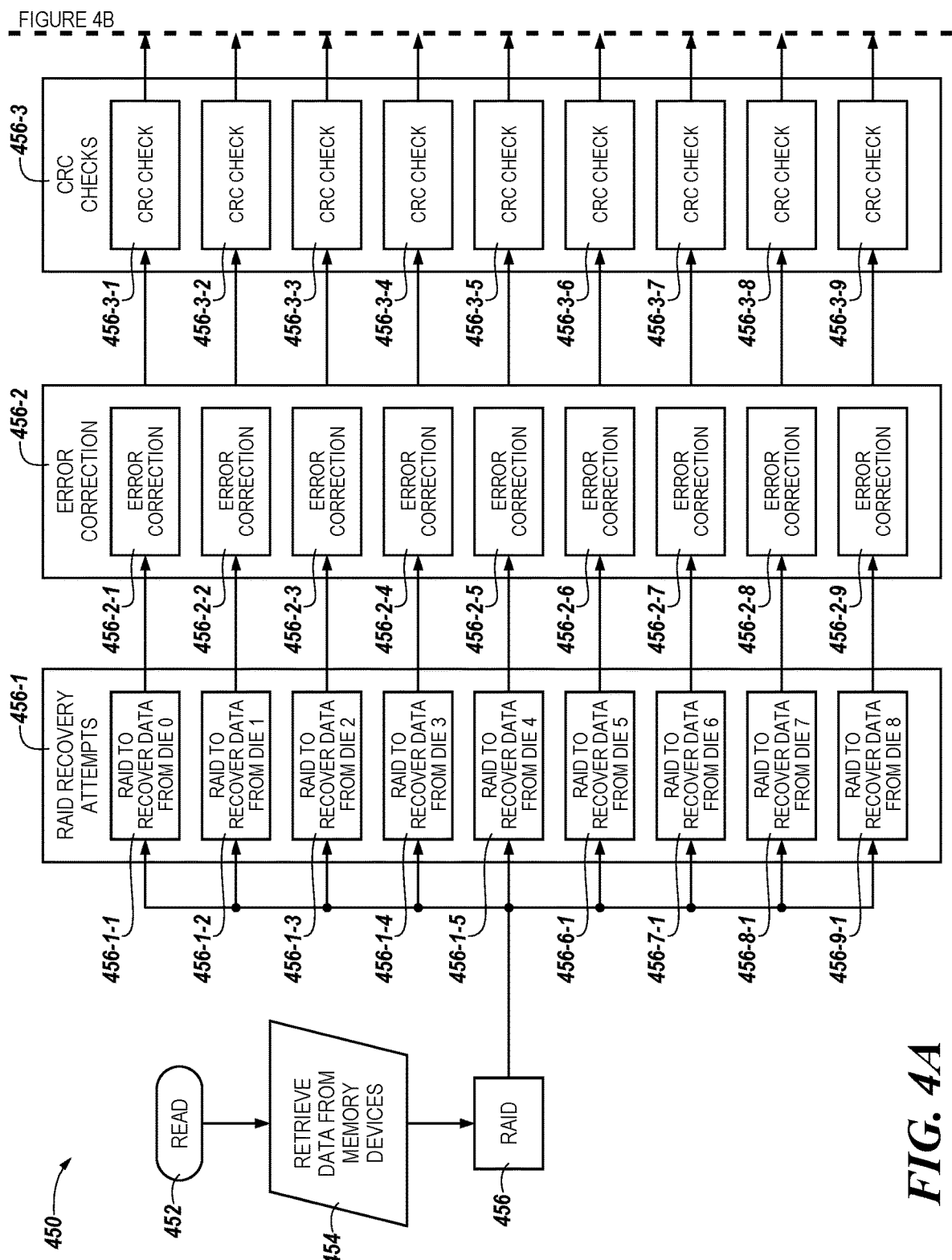
FIGS. 4A-4B are a flow diagram illustrating a locked-RAID process for data protection of subsets of one or more user data blocks (UDBs) corresponding to a cache line in accordance with a number of embodiments of the present disclosure.
Figure 4B:
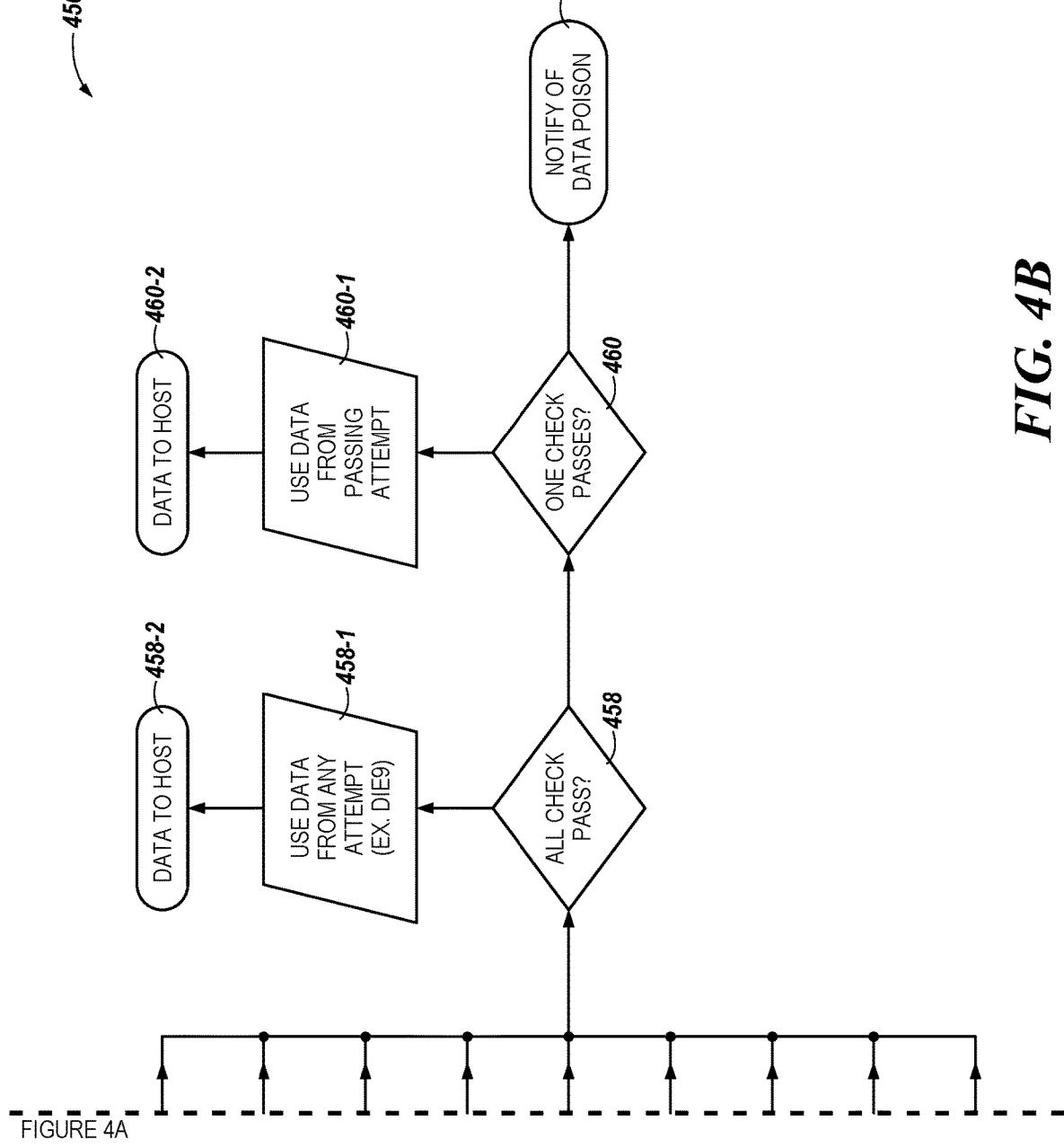

FIGS. 4A-4B are a flow diagram 450 illustrating a locked-RAID process for subsets respective corresponding to memory units in accordance with a number of embodiments of the present disclosure. As illustrated in FIG. 4A, at 452, a read command is received to access data (e.g., an UDB) from one or more memory devices (e.g., corresponding to one or more memory devices 226 illustrated in FIGS. 2A and 2B, respectively).

As illustrated in FIG. 4A, at 454, subsets corresponding to a RAID channel (e.g., subsets 331-1, . . . , 331-10 illustrated in FIG. 3) can be read respectively from memory dice (e.g., corresponding to one or more memory devices 126 and/or 226 illustrated in FIGS. 1, 2A, and 2B, respectively). The subsets can include an UDB requested by the host as well as the other data (e.g., other UDBs, error correction information, error detection information, etc.) corresponding to the same RAID stripe. As described herein, one or more subsets including a PDB and auxiliary data can be read from different memory dice than those memory dice from which the subsets including the UDBs.

As illustrated in FIG. 4A, at 456, a RAID process is triggered with error correction/detection operations following. For example, at 456-1, a RAID operation is performed on a respective subset read from each memory die storing one or more UDBs as well as auxiliary data (e.g., error correction information, error detection information, etc.). For example, at 456-1-1, . . . , 456-1-9, RAID operations can be performed to respectively recover subsets read from nine memory dice (e.g., subsets 331-1, . . . , 331-8 and 331-10).

As illustrated in FIG. 4A, at 456-2, respective error correction operations can be further performed (e.g., at the ECC decoder 216-2 and/or illustrated in FIGS. 2A and 2B) on each RAID stripe subsequent to a respective RAID operation 456-1-1, . . . , 456-1-9. For example, at 456-2-1, . . . , 456-2-9, error correction operations can be performed to respectively error-correct resulting RAID stripes passed from 456-1-1, . . . , 456-1-9. In some embodiments, each error correction operation performed at 456-2 can correct bit errors on multiple subsets (e.g., corresponding to multiple memory dice), such as two bit errors (e.g., respectively on two different subsets), although embodiments are not so limited.

As illustrated in FIG. 4A, at 456-3, each resulting (e.g., error-corrected) RAID stripe can be further checked for remaining errors (e.g., at the CRC decoder 215 illustrated in FIGS. 2A and 2B). For example, at 456-3-1, . . . , 456-3-9, CRC checks can be performed respectively at resulting RAID stripes passed from 456-2-1, . . . , 456-2-9.

As used herein, the term "resulting RAID stripe" can refer to data corresponding to a result of each process described in association with 456 of FIG. 4. For example, a resulting RAID stripe (e.g., a result) of each step 456-1 can be a portion of a RAID stripe including one or more subsets originally input to a RAID operation as well as a recovered subset. For example, a resulting RAID stripe (e.g., a result) of each step 456-2 can be a portion of a RAID stripe including one or more subsets originally input to a RAID operation and a recovered subset that are error-corrected (e.g., at the ECC decoder 216-2 using ECC data).

Subsequent to the CRC checks performed at 456-3 and at 458 (as illustrated in FIG. 4B), it is determined if each one of the resulting RAID stripes has passed a respective CRC check. If so, the flow diagram 450 proceeds to 458-1 and 458-2 and any one of the resulting RAID stripes can be provided as an output (e.g., to the security decoder 217-2 illustrated in FIGS. 2A and 2B) to, for example, the security decoder 214-2 illustrated in FIGS. 2A and 2B. If not, the flow diagram proceeds to 460-1 and 460-2 (as illustrated in FIG. 4B) and only those resulting RAID stripes (e.g., one of the resulting RAID stripes passed from 456-3) that have passed a respective CRC check performed at 456-3 can be provided as an output to the security decoder 214-2. If none of the resulting RAID stripes has passed a respective CRC check, then the flow diagram 450 proceeds to 462 (as illustrated in FIG. 4B) and the host (e.g., the host 103 illustrated in FIG. 1) can be notified of the data (e.g., the RAID stripe) being poisoned.

The RAID operations (e.g., performed at 456-1) along with error correction/detection operations (e.g., performed at 456-2 and 456-3 respectively) can be performed in various manners. In one example, each set of RAID operations 456-1-1, . . . , 456-1-9, error correction operations 456-2-1, . . . , 456-2-9, and/or error detection operations 456-3-1, . . . , 456-3-9 can be performed in parallel.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:

receiving a read command to access a first user data block (UDB) stored in one or more first memory units;

responsive to receiving the read command:

performing, using a parity data block comprising data recovery information and read from a second one or more memory units, a respective data recovery operation on each of a plurality of subsets corresponding to the first UDB, wherein each subset of the plurality of subsets corresponds to a respective memory unit of the one or more first memory units;

performing, to correct one or more bit errors remaining in at least two subsets of the plurality of subsets, a respective error correction operation on each one of a plurality of first results of the plurality of respective data recovery operations using auxiliary data read from one or more third memory units, wherein the auxiliary data further comprises error correction information and error detection information;

performing a respective error detection operation on each one of a plurality of second results of the plurality of respective error correction operation using the error detection information; and providing, as a response to the read command, a notification indicating that none of the plurality of second results is indicated as not including one or more bit errors.

2. The method of claim 1, wherein:

the auxiliary data further comprises error detection information; and the method further comprises performing, prior to performing the data recovery operation, an error detection operation on the first UDB using the error detection information to indicate whether the first UDB includes the one or more bit errors.

3. The method of claim 1, further comprising performing the plurality of respective data recovery operations in parallel.

4. The method of claim 1, further comprising providing, as a response to the read command, one of the plurality of second results that is indicated as not including one or more bit errors.

5. An apparatus, comprising:

a plurality of memory units; and a controller communicatively coupled to the plurality of memory units respectively via a plurality of channels, the controller configured to:

receive a read command to access a first user data block (UDB) stored in one or more first memory units of the plurality of memory units;

in response to receipt of the read command:

read, from the one or more first memory units, subsets of a plurality of subsets and respectively corresponding to a plurality of UDBs, wherein the plurality of UDBs includes the first UDB and corresponding to a redundant array of independent disks (RAID);

read, from one or more second memory units, one or more subsets of the plurality of subsets and corresponding to auxiliary data that comprises error correction information;

read, from one or more third memory units, one or more subsets of the plurality of subsets and corresponding to a parity data block (PDB) comprising data recovery information;

perform, using the data recovery information of the PDB and in response to the plurality of subsets being indicated as containing one or more bit errors, a data recovery operation on at least one subset of a plurality of subsets of the first UDB to recover the at least one subset; and perform, using the error correction information, a double-error-correction (DEC) operation on the plurality of subsets as the error correction operation to correct:

a single bit error in a first subset of the plurality of subsets used for the data recovery operation; and a single bit error in a second subset of the plurality of subsets that is mirrored by the single bit error in the first subset, wherein the second subset is a subset recovered via the data recovery operation.

6. The apparatus of claim 5, wherein the controller is configured to perform the data recovery operation on each subset of the plurality of subsets regardless of whether each subset includes one or more bit errors or not.

7. The apparatus of claim 5, wherein:

the auxiliary data further comprises error detection information; and the controller is configured to:

perform an error detection operation on a codeword comprising a plurality of UDBs corresponding to a RAID stripe, wherein the plurality of UDBs includes the first UDB; and perform the data recovery operation in response to the error detection operation indicating one or more bit errors in codeword.

8. The apparatus of claim 7, wherein the error detection information corresponds to cyclic redundancy check (CRC) data.

9. The apparatus of claim 5, wherein:

the auxiliary data further comprises error detection information; and the controller is further configured to perform an error detection operation on the plurality of UDBs subsequent to the data recovery operation and to determine if the UDB still contains one or more bit errors.

10. The apparatus of claim 5, wherein the data recovery information corresponds to redundant array of independent disks (RAID) parity data.

11. An apparatus, comprising:

a plurality of memory units configured to store one or more user data blocks (UDBs); and a controller communicatively coupled to the plurality of memory units respectively via a plurality of channels, the controller configured to:

receive data corresponding to a first UDB as part of a write command to write the first UDB to one or more first memory units of the plurality of memory units;

generate error correction information based on the first UDB, wherein the error correction information is to correct one or more bit errors within the first UDB;

write, via one or more data input/output (DQ) pins, the first UDB to the one or more first memory units; and write, via one or more data mask inversion (DMI) pins, the error correction information to a second memory unit of the plurality of memory units.

12. The apparatus of claim 11, wherein:

the first UDB corresponds to a particular redundant array of independent disks (RAID) stripe, the particular RAID stripe comprising the first UDB, a second UDB, and the error correction information; and the controller is further configured to generate RAID parity data based on data corresponding to the particular RAID stripe.

13. The apparatus of claim 12, wherein the controller is configured to generate the error correction information based on the first UDB and the second UDB.

14. The apparatus of claim 13, wherein the controller is configured to:

receive a read command to access the first UDB from the one or more first memory units;

perform a data recovery operation on each subset of a plurality of subsets corresponding to the particular RAID stripe using the RAID parity data, wherein the plurality of subsets corresponds to data read respectively from the one or more first memory units and the second memory unit; and perform, to correct one or more bit errors on at least two subsets of the plurality of subsets, an error correction operation on each subset of the plurality of subsets using the error correction information.

15. The apparatus of claim 14, wherein the controller is configured to perform, to recover a subset of the plurality of subsets, one or more XOR operations among other subsets of the plurality of subsets.

* * * * *